United States Patent
Nagayoshi et al.

(10) Patent No.: US 8,804,474 B2
(45) Date of Patent: Aug. 12, 2014

(54) OPTICAL INFORMATION RECORDING/REPRODUCING APPARATUS

(71) Applicant: Hitachi Media Electronics Co., Ltd., Oshu (JP)

(72) Inventors: Mayumi Nagayoshi, Tokyo (JP); Kenichi Shimada, Tokyo (JP); Kazuyoshi Yamazaki, Tokyo (JP); Taku Hoshizawa, Tokyo (JP); Makoto Hosaka, Tokyo (JP)

(73) Assignee: Hitachi Media Electronics Co., Ltd., Yokohama-shi (JP)

( * ) Notice: Subject to any disclaimer, the term of this patent is extended or adjusted under 35 U.S.C. 154(b) by 0 days.

(21) Appl. No.: 13/959,773

(22) Filed: Aug. 6, 2013

(65) Prior Publication Data

US 2014/0043952 A1    Feb. 13, 2014

(30) Foreign Application Priority Data

Aug. 6, 2012 (JP) ................................ 2012-173934
Apr. 10, 2013 (JP) ................................ 2013-081734

(51) Int. Cl.
    *G11B 7/00* (2006.01)
(52) U.S. Cl.
    USPC .... 369/102; 369/103; 369/112.1; 369/112.15
(58) Field of Classification Search
    None
    See application file for complete search history.

(56) References Cited

U.S. PATENT DOCUMENTS

| 7,889,407 | B2* | 2/2011 | Sako et al. | 359/27 |
| 7,889,619 | B2* | 2/2011 | Tokuyama | 369/103 |
| 2006/0232841 | A1* | 10/2006 | Toishi et al. | 359/24 |

FOREIGN PATENT DOCUMENTS

| JP | 2006-17898 | 1/2006 |
| JP | 2006-23445 | 1/2006 |

* cited by examiner

*Primary Examiner* — Muhammad N Edun
(74) *Attorney, Agent, or Firm* — Antonelli, Terry, Stout & Kraus, LLP.

(57) ABSTRACT

An optical information recording/reproducing apparatus, to apply holograms of an angle multiplex recording method therein includes: a light source to emit a light beam; a divider unit to divide the light beam into a signal beam and a reference light; an angle variable unit to change an angle of the reference light incident upon an optical information recording medium; a spatial light modulator unit to add information to the signal beam; an objective lens to irradiate the signal beam on the medium; an image pickup unit to detect a diffracted light generating from a recording region, when the reference light is irradiated on the medium; and an optical element to shape a form of light flux of the reference light, so that a light flux diameter of the reference light in a multiplex direction becomes larger than the light flux diameter of the reference light in a pitch direction.

14 Claims, 15 Drawing Sheets

EXACT CIRCLE     EXIT LIGHT FROM RELAY LENS     EXIT LIGHT FROM BEAM SHAPER

OPTICAL INFORMATION RECORDING/REPRODUCING APPARATUS

This application relates to and claims priority from Japanese Patent Applications No. 2013-081734 filed on Apr. 10, 2013, and No. 2012-173934 filed on Aug. 6, 2012, the entire disclosures of which are incorporated herein by reference.

BACKGROUND OF THE INVENTION

The present invention relates to an apparatus and a method, for recording information on an optical information recording medium and for reproducing the information from the optical information recording medium, with applying holography therein.

At present, in accordance with a Blu-ray Disc (™) standard, applying a blue-violet semiconductor laser therein enables to commercialization of an optical disc, having a recording density/capacity of around 50 GB even for a consumer product. In the future, such a requirement will be made of enlarging a scale of the capacity, even for the optical disc, to have a capacity as large, as a HDD (i.e., a Hard Disk Drive) has, such as, 100 GB to 1 TB, for example.

However, for the purpose of accomplishing such ultra-high density with an optical disc, there is necessity of a technology, for achieving the high-density by means of a new method, differing from the technology for achieving by means of the short wavelength and the high-NA.

While many studies are made relating to a storage technology for the next generation, attentions are paid upon a hologram recording technology, for recording digital information with using the holography therein.

The hologram technology is a technology for recording information on a recording medium, by placing a signal beam having information of page data, being modulated two-dimensionally by a spatial light modulator, upon a reference light, within the recording medium, and thereby producing a modulation of refractive index within the recording medium through an interference pattern generated at that time.

When reproducing the information, the reference light, which was used when recording, is irradiated upon the recording medium, and this brings about a diffracted light, because the hologram recorded within the recording medium functions, as if a diffraction grating therein. This diffracted light is reproduced as the same light beams; including the signal beam recorded and phase information thereof.

The signal beam reproduced is detected two-dimensionally at high speed, with using an optical detector, such as, a CMOS or a CCD, etc. In this manner, the hologram recording technology enables to record two-dimensional information on an optical recording medium, at once, through one (1) piece of the hologram, and also to reproduce this information, and because it enables overwriting of plural numbers of page data at a certain place on the recording medium; therefore, it enables to achieve recording/reproducing of a large amount of information at high speed.

As one of the hologram recording methods, an angel multiplexing recording is already known. This is a method for conducting a multiplex recording while changing an incident angle of the reference light upon an optical information recording medium. In the hologram recording, efficiency thereof comes up to the best when the signal beam and the reference light are irradiated within the same region, and this results a prevention of unnecessary exposure of the medium, and thereby achieving a high density recording. However, in the angle multiplexing recording, an area changes on the medium where the irradiation is made, because of change of an effective diameter of the light beam when scanning an incident angle of the reference light on the medium. With this, the medium is exposed to the light even in a region, which does not contribute to the recording, and then there is a problem that the recording capacity is reduced down.

As an optical information recording/reproducing technology for dissolving such problem is disclosed, for example, in Japanese Patent Laying-Open No. 2006-17898 (2006) (Patent Document 1). In this publication, it is described that "a laser light emitting from a laser light source is divided into a signal beam and a reference light in a beam splitter, when recording, for keeping a range of irradiation of this reference light upon a hologram recording medium always constant, even if the incident angle of the reference light changes, when recording the hologram in accordance with the angel multiplexing recoding method, and the reference light comes to be parallel lights through a zoom-type beam expander. In that instance, a controller apparatus changes a magnifying power of the zoom-type beam expander depending on a rotation angle of a variable-type rotation mirror, so as to change the diameter of the reference beam, and thereby brining the range of irradiation of the reference light upon the recording medium to be constant, irrespective of the incident angle of the reference light upon the recording medium".

Also, for example, in Japanese Patent Laying-Open No. 2006-23445 (2006), it is described that "when changing an angle of a scan mirror 12 for chaining an incident angle of a reference light 200 upon a hologram recording material 15, also a slit 11 changes an angle thereof linking with, and thereby changing a beam diameter of the reference light 200 by the slit 11, so that the irradiation range of the reference light 200 upon the hologram recording material 15 comes to be constant, but not changing depending on change of the incident angel of the reference light 200. With this, it is possible to keep the area, upon which this reference light irradiates the hologram material 15, always constant, even if the incident angle of the reference light changes, when recording the hologram in accordance with the angle multiplexing recording method."

PRIOR ART DOCUMENTS

Patent Documents

[Patent Document 1] Japanese Patent Laying-Open No. 2006-17898 (2006); and
[Patent Document 2] Japanese Patent Laying-Open No. 2006-23445 (2006).

BRIEF SUMMARY OF THE INVENTION

By the way, a direction into which the magnifying power of the reference light should be changed depending on an incident angle of the reference light when trying to irradiate the signal beam and the reference light upon the same region on the optical information recording medium, for recording/reproducing with high efficiency, it is a specific direction, i.e., the direction, into which the reference light enters into the medium. However, with the method of changing the magnifying power with applying such zoom-type beam expander, as was mentioned in the Patent Document 1, a further increase of the efficiency is required for changing the magnifying power while keeping a ratio between the vertical and the horizontal constant.

Also, with the irradiation range fixing means mentioned in the Patent Document 2, in more details thereof, it is a circular slit, being inclined by an angle same to the incident angle "θ"

of that reference light, within the optical path of the reference light. Thus, in accordance with that conventional art, for the purpose of keeping an irradiation area of the reference light constant, in spite of the incident angle, a circular beam diameter of the reference light to be incident upon is narrowed into an orthogonal projection shape thereof, by inclining that slit by "θ", and thereby keeping the beam diameter constant within the irradiation range on the optical information recording medium. Thus, this is made upon a principle of reflecting or absorbing the reference light in the region, not contributing to the recording, to be attenuated, and with this, there is brought about a problem of generating an eclipse or shading of the reference light, always, on the slit, and thereby lowering an efficiency of utilizing the light in an optical system. Also, there is a necessity of a mechanism for inclining that slit by an angle same to the incident angle "θ" of the reference light, and this results the optical information recording/reproducing apparatus to be expensive in the price thereof.

For that reason, in the hologram recording and/or reproducing of a double (2) ray angle multiplexing recording method, for achieving high-speed recording and/or reproducing of data with high quality; i.e., being high in a S/N ratio, there are strong demands on an optical information recording/reproducing apparatus, for enabling utilization of the light emitting from a light source; in other words, being high in the efficiency thereof, and being cheaply practicable.

Then, according to the present invention, being accomplished by taking the problem(s) in the conventional technologies mentioned above into the consideration thereof, in more details thereof, an object thereof is to provide an optical information recording/reproducing apparatus for enabling an increase of an efficiency of utilizing the light in the optical system, with the relatively simple structure thereof.

The problem(s) mentioned above is/are dissolved by the invention described in the pending claims, for example.

With the present invention, there can be obtained such a superior effect that, there is provided an optical information recording/reproducing apparatus, enabling a further effective utilization of the light emitting from the light source, and having an optical system therein, which is cheaply practicable, for achieving the high-speed recording and/or reproducing of data at high quality, i.e., being high in the S/N ratio, in the hologram recording and/or reproducing of the double (2) ray angle multiplexing recording method.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Figure 1:
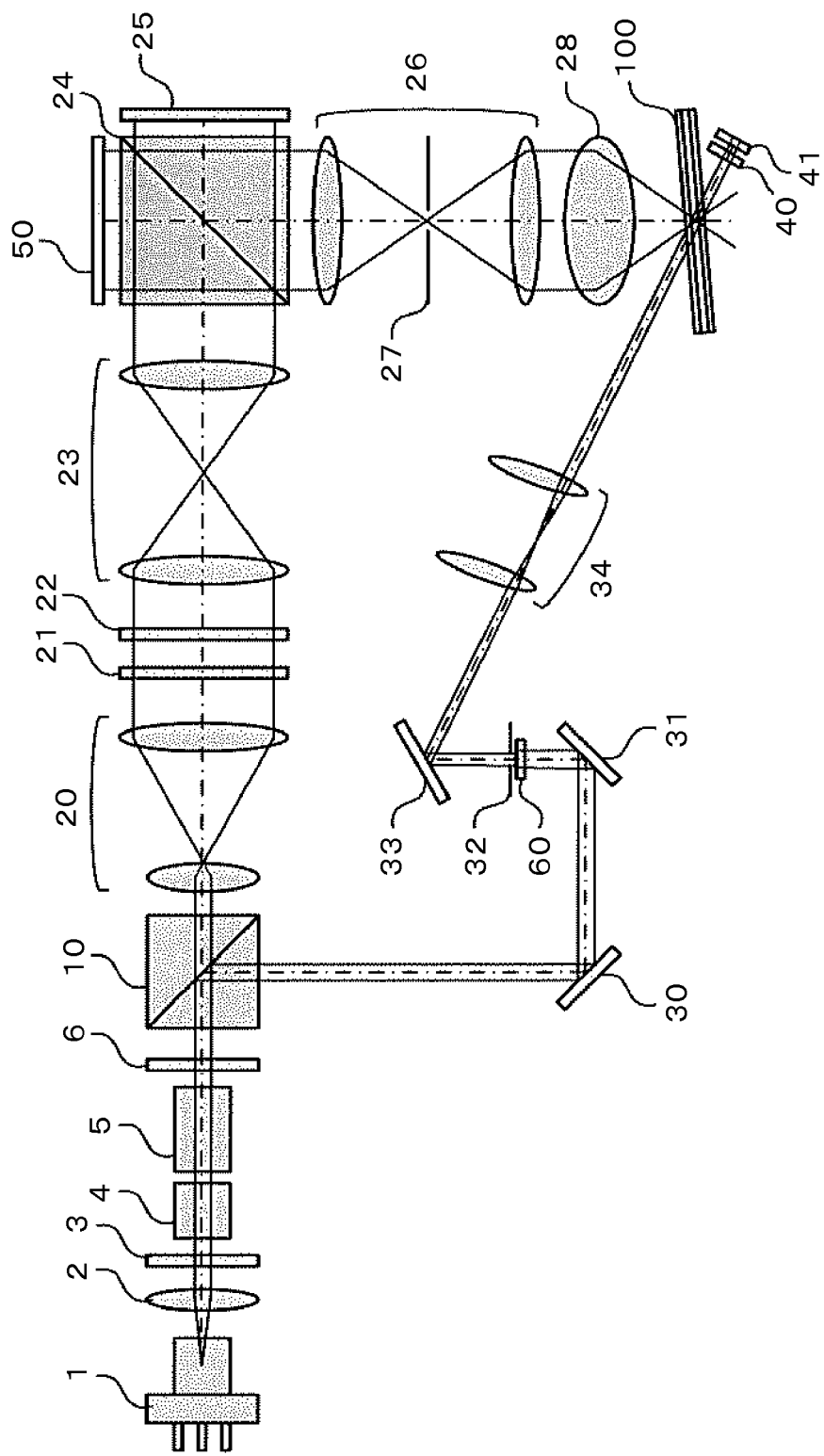
FIG. 1 is a view for showing an example of an optical system of an pickup device for use in a first embodiment (i.e., an embodiment 1) according to the present invention.

Hereinafter, explanation will be given on plural numbers of embodiments for implementing the present invention therein, by referring to the drawings attached herewith. However, hereinafter, explanation will be given on an optical system of a pickup device, as a distinctive feature according to the present invention, before giving the explanation of the entire structure of the optical information recording/reproducing apparatus, for reproducing or recording/reproducing digital information with applying hologram therein.

Embodiment 1

Optical System of Pickup Device for Use in Hologram

FIG. 1 shows the configuration of, in particular, the pickup device for use in hologram of a double (2) ray angle multiplexing recording method, according to a first embodiment (i.e., an embodiment 1) of the present invention.

First of all, explanation will be given on a recording method according to the present embodiment (i.e., the embodiment 1). A light beam exitting from a light source 1 passes through a collimate lens 2, to be converted to have a desired beam diameter thereof. Thereafter, after passing through a shutter 3, it is incident upon a beam shaper 4. Herein, the beam shaper 4 is for shaping a beam to be exact circular, by letting it to penetrate therethrough, in particular, this is because, the shape of the beam exitting from it is not exact circular when the light source 1 is made from a laser. The light after penetrating through that beam shaper 4 enters into or is incident upon an optical isolator 5. Herein, when a light is incident upon an optical element, in general, a surface reflection is generated on a surface of the optical element, and for example, there are sometimes cases where the surface reflection light turns back to the light source. If there is a return of the turning light back to the light source, the light is absorbed on the light source and this comes to be heat therein, and this sometimes brings about cases where the light emitting condition becomes instable. For this reason, the optical isolator 5 is an element for preventing the light from being turned back to the light source 1. Thereafter, the light beam is controlled, in the polarization direction by a polarization variable element 6, which is constructed with a ½ wavelength plate, etc., for example, in such a manner that a ration between an amount of P-polarized light and an amount of S-polarized light comes to be a desired value, and thereafter is incident upon a PBS prism 10. However, in the present embodiment, it is assumed that the light is converted into the P-polarized light and the S-polarized light, when recording, and is converted into the S-polarized light, when reproducing, by that polarization variable element 6.

On the other hand, the PBS prism 10 mentioned above has characteristics of passing the P-polarized light therethrough, but reflecting the S-polarized light thereupon. However, in the explanation given below, the light beam passing through the PBS prism 10 is called, "signal beam", while the light beam reflecting upon that PBS prism, "reference light". And, the signal beam passing through the PBS prism 10, after being converted to have the desired beam diameter thereof, via passing through a shutter 22, a phase mask 22, a relay lens 23 and a PBS prism 24, is incident upon a spatial light modulator 25, wherein it is added with two-dimensional (being abbreviated "2D", hereinafter) information. Also, the spatial light modulator 25 is an optical element for adding the 2D information to the signal beam, and as this is applicable, such as, LCOS (Liquid Crystal on silicon) and/or DMD (Digital Mirror Device) and/or GLV (Grating Light Valve), etc., for example. Herein, the signal beam is converted into a shape depending on a pixel of the spatial light modulator. For example, if the pixel has a square (i.e., quadrate) shape, then the signal beam comes into the square (i.e., quadrate) shape. Thereafter, the signal beam, which is added with the 2D information by the spatial light modulator 25, is reflected upon the PBS prism 24, and is condensed into an optical information recording medium 100, via a relay lens 26, a spatial filter 27 and an objective lens 28.

On the other hand, the reference light reflecting upon the PBS prism 10 is reflected upon mirrors 30 and 31, and after being stopped or narrowed in the beam diameter thereof by an iris 32, is incident upon a galvano mirror 33. Herein, with a shape and a size of the iris 32, as was mentioned previously, it is preferable that they are so shaped that also the reference light, which be overlapped on the signal beam within an inside of the optical information recording medium 100 when recording, comes to be square (i.e., quadrate) in the cross-section shape thereof, in the similar manner, in case where the signal beam is square (i.e., quadrate) in a beam cross-section thereof. With this, it is possible to increase, further, an efficiency of utilizing the light. However, herein, an effective light flux diameter of the reference light is determined, fundamentally, to be the minimum diameter necessary to be overlapped on the signal beam mentioned above inside the optical information recording medium 100. This is for the purpose of preventing an excess region on the optical information recording medium 100 from being exposed; i.e., for using the recording capacity thereof, effectively, and thereby achieving high density recording.

Figure 2A:
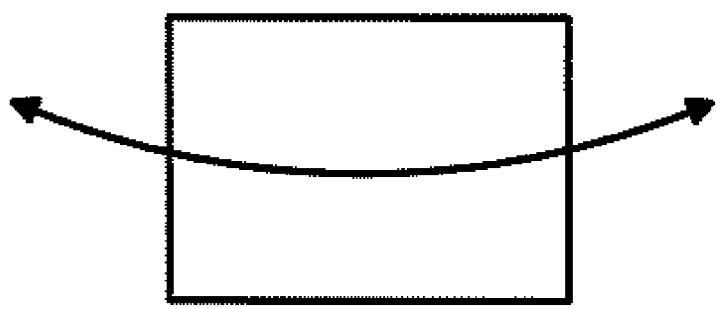
FIG. 2A is a view for showing a one dimensional scanning direction by means of a galvano mirror or a MEMS, in the embodiment 1 mentioned above.
Figure 2B:
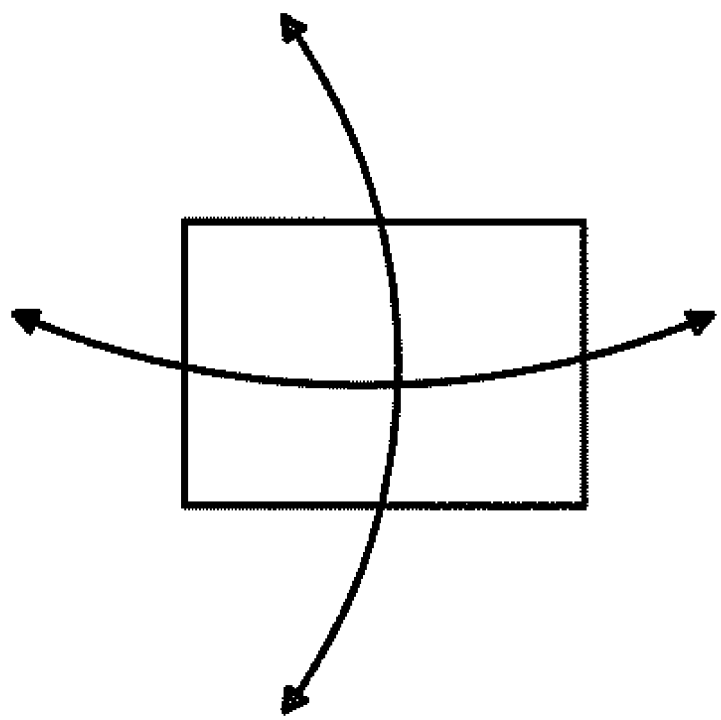
FIG. 2B is a view for showing a two dimensional scanning direction by means of the galvano mirror or the MEMS, in the embodiment 1 mentioned above.

The galvano mirror 33 is a mirror element for controlling an incident angle of a light beam, and with this, it is possible to control the incident angle of the reference light upon the optical information recording medium 100. Thus, with this, an angle multiplexing recording can be achieved. However, the galvano mirror 33 may be formed by treating an anti-reflection coating on an optical glass, to be applied, generally, or may be made by forming dielectric multi-layers, such as, $SiO_2$ or $TiO_2$, etc., for example, on Al or silver. In particular, with applying the materials of the latter therein, it is possible to achieve both, high reflectivity and anti-oxidation threof. Also, as a substitute of the galvano mirror 33 may be applied a MEMS (Micro Electro Mechanical Systems) therein. With applying such MEMS therein, there can be achieved a further high-speed driving thereof, and thereby obtaining high-speed of recording/reproducing. Also, the galvano mirror 33 or the MEMS may be driven, so as to conduct a one-dimensional (hereinafter, being described "1D") scanning, as is shown in FIG. 2A, or may be driven, so as to conduct the 2D scanning, as is shown in FIG. 2B. In particular, if it is driven to conduct the 2D scanning, it is possible to make the multiplex recording in two (2) axial directions, and thereby achieving a further high-density recording.

The reference light reflecting upon the galvano mirror 33, for passing through a scanner lens 34, is incident upon, to be approximately parallel lights, within the optical information recording medium 100. In this instance, incidences of the signal beam and the reference light, overlapping each other, within the optical information recording medium 100, bring about an interference pattern within the optical information recording medium 100. And, this interference pattern is recorded as the hologram within the optical information recording medium 100. In the present embodiment, the hologram, with which the 2D information is recorded, is called "page", and a region, in which the pages are multiplexed, is called "book", respectively.

After the information is recorded on the optical information recording medium 100, the shutter 3 is closed, and information to be recorded next is displayed by the spatial light modulator 25. At the same time, the galvano mirror 33 rotates only by a very little angle "φ", and the incident angle of the reference light is changed upon the optical information recording medium 100. Thereafter, when the shutter 3 is opened, the information to be recorded next is recorded on a next page of the same book of the optical information recording medium 100, at an angle differing from that of the previous recording. With repetition of this, the angle multiplex recording is conducted. And, when a number of times of such angle multiplex recording reaches to a predetermined number, then it moves to a next book.

Hereinafter, explanation will be given on a method for moving the book. First of all, the polarization variable element 6 is controlled in such a manner that the polarization of the light beam exitting from the polarization variable element 6 comes to be a S-polarized light. With this, the light beam passing through the polarization variable element 6 is reflected upon the PBS prism 10, and a result thereof, only the reference light is irradiated on the disc. And, the position of the optical information recording medium 100 is shifted (moves) with respect to the objective lens 28. With this, it is possible to dispose an un-recorded region on the optical information recording medium 100 at a recordable position (bringing it to be coincident with), where the signal beam and the reference light overlap with each other.

Next, explanation will be given on a method for reproducing according to the present embodiment. The light beam exiting from the light source 1, after being converted to have the desired beam diameter while penetrating through the collimate lens 2, passes through the shutter 3, the beam shaper 4 and the optical isolator 5, and further it is incident upon the polarization variable element 6. And, the light beam is converted into the S-polarized light by the polarization variable element 6, and is reflected upon the PBS prism 10. Herein, in the present embodiment, the reference light reflected upon that PBS prism 10 is called "reproduction light". That production light is incident upon, after passing through the mirrors 30 and 31, the iris 32, the galvano mirror 33, the scanner lens 34, the optical information recording medium 100 and the ¼ wavelength plate 40, upon a galvano mirror 41.

The galvano mirror 41 is so controlled that an incident light upon the reflection surface thereof always come to be vertical thereto, approximately, and as a result thereof, the reproduction light incident upon the galvano mirror 41 is reflected thereupon, into an opposite direction, approximately, and after passing through the ¼ wavelength plate 40, again, it is incident upon the optical information recording medium 100. Herein, because it passes through the ¼ wavelength plate 40, twice (2 times), then the reproduction light is converted from the S-polarized light into the P-polarized light. Thereafter, the reproduction light is incident, after passing through the objective lens 28, the spatial filter 27 and further the relay lens 26, upon the PBS prism 24. However, the spatial filter 27 is constructed with an iris, through which only the reproduction light of the book to be reproduced can pass, and a mirror for reflecting diffracted light(s) from the book(s) other than that. Thereafter, the reproduction light passes through the PBS prism 24, because it is the P-polarized light, and incident upon an image pickup element 50. And, upon basis of the reproduction light incident upon the image pickup element 50, reproduced image data is produced.

Next, the galvano mirror 33 is rotated by a very small angle "φ", and as a result thereof, an incident angle of the reproduction light is changed on the optical information recording medium 100. With this, reproduction video data is reproduced of a page differing therefrom in an angle thereof, within the optical information recording medium 100. With repetition of the reproduction steps mentioned above, the information recorded through the angle multiplex recording is reproduced.

Figure 3:
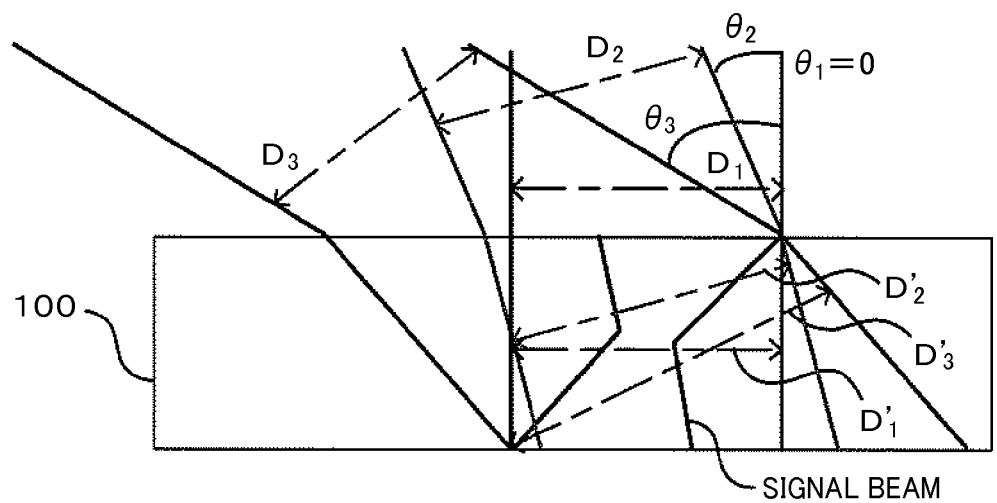
FIG. 3 is a view for showing an example of changes of an effective light beam diameter within an air and a medium, depending on an incident angle of a reference light in the embodiment 1 mentioned above.

Hereinafter, further detailed explanation will be given on the feature of the present embodiment mentioned above. The present optical pickup device conducts the angle multiplex recording while changing the incident angel of the reference beam upon the optical information recording medium 100. Regarding the reference light, consideration is paid upon a direction for recording information through multiplexing (i.e., a multiplex direction), and a pitch direction perpendicular thereto. For simplifying the angle control, it is assumed that the reference light is incident upon the optical information recording medium 100 at the right angle (=90 degrees), in the pitch direction, then the diameter of the light flux within the medium comes to be equal to that of the light flux in the air. On the other hand, it is assumed to be incident upon the optical information recording medium 100 at a certain angle, in the multiplex direction. Hereinafter, mentioning is made on the multiplex direction, in the details thereof. The reference light incident upon the optical information recording medium 100 at a predetermined angle is refracted in accordance with Snell's law within the optical information recording medium 100. Since also a refraction angle is changed when the incident angle changes; i.e., the diameter of the effective light flux of the light beam is also changed depending on the incident angle of the reference light. For example, as shown in FIG. 3, if assuming that the diameters of the effective light flux are "$D_1$" and "$D_1'$" within the air and the medium "$D_2$" and "$D_2'$", when the reference light is incident upon the optical information recording medium 100, vertically ($\Theta_1$=0), when it is incident thereupon at "$\Theta_2$", and "$D_3$" and "$D_3'$" when it is incident thereupon at "$\Theta_3$", respectively, and also that all the diameters of the light fluxes are equal to in the air, then the following equation can be established among those variations:

$$\Theta_1 < \Theta_2 < \Theta_3 \text{ when } D_1 = D_2 = D_3$$

$$D_3 > D_2 > D_1 \qquad \text{(Eq. 1)}$$

Namely, when the diameters of the effective lights in the air are equal to, then the greater in the incident angle, the greater in the diameter of the effective light within the medium.

Important things in the hologram recording are an area of the region, where the signal beam and the reference light overlap on each other (=contributing to recording), within the optical information recording medium 100, and also an energy being irradiated upon that area. Since the effective light flux diameter of the signal beam can be determined, uniquely, then also the effective light flux diameter of the reference light, which is minimally necessary for recording at the minimum, can be determined, uniquely, for each angle. However, since the reference light propagates in an optical path with a diameter, being equal to the light diameter necessary for recording or greater than that, it is preferable that a cross-section shape (or diameter) of the beam can be changed (or shaped) into an arbitrary shape (or diameter), freely, by the beam shaper 60, i.e., an optical element, and in such cases, idealistically, since the eclipse caused by the iris can extinguish, completely, this also increases the efficiency.

However, because of an aberration, etc., it is difficult to change the cross-section shape (or diameter), freely, into an arbitrary shape (or diameter), only by means of the beam shaper 60, and for this reason, practically, an optical element is disposed within the optical path for the reference light and the signal beam, which reduces the eclipse down to the minimum, and thereby shaping the shape and/or the diameter of the light flux so as to be irradiated upon only the region, in which the signal beam and the reference light contribute to the recording within the optical information recording medium. Further, according to the present embodiment, that optical element includes an iris 32 in a part thereof, and a size of this iris may be such that it can be obtained by converting a light flux diameter within the medium, which is necessary for recording, into a light flux diameter within the air, in the multiplex direction and the pitch direction, as will be explained later. Herein, if assuming that the light flux diameters are and "$\phi_{air\text{-}multi}$" and "$\phi_{air\text{-}pitch}$", respectively, within the air, contributing to recording in the multiplex direction and the pitch direction, then a relationship can be established, which can be presented by the following equation (Eq. 2):

$$\phi_{air\text{-}multi} \geq \phi_{air\text{-}pitch} \tag{Eq. 2}$$

For this reason, it is preferable that the iris 32 is rectangular in the shape thereof. However, since the reference light has the diameter equal to or greater than the size of the iris, and further, since the beam reaches to the iris 32 under the condition of an exact circle or an ellipse in the cross-section thereof, then there is a light generating the eclipse on that iris 32. This results into a cause of lowering the efficiency of the optical system. Then, the iris 32 mentioned above is determined to be a shape and a diameter, which will be mentioned later.

Figure 4A:
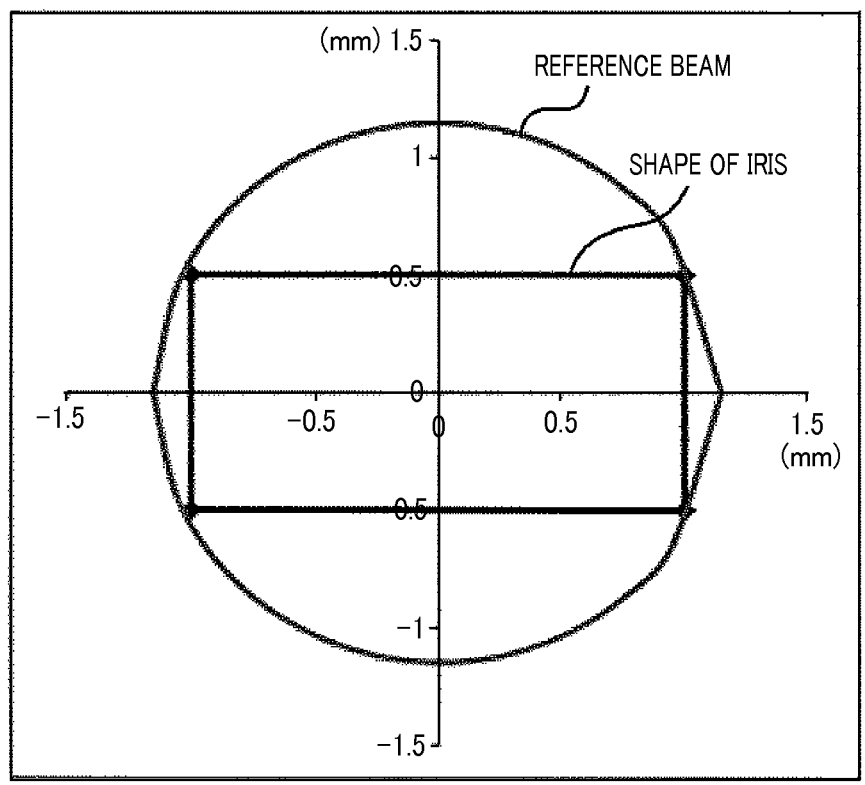
FIG. 4A is a view for showing shapes of a reference beam and an iris in the embodiment 1 mentioned above.
Figure 4B:
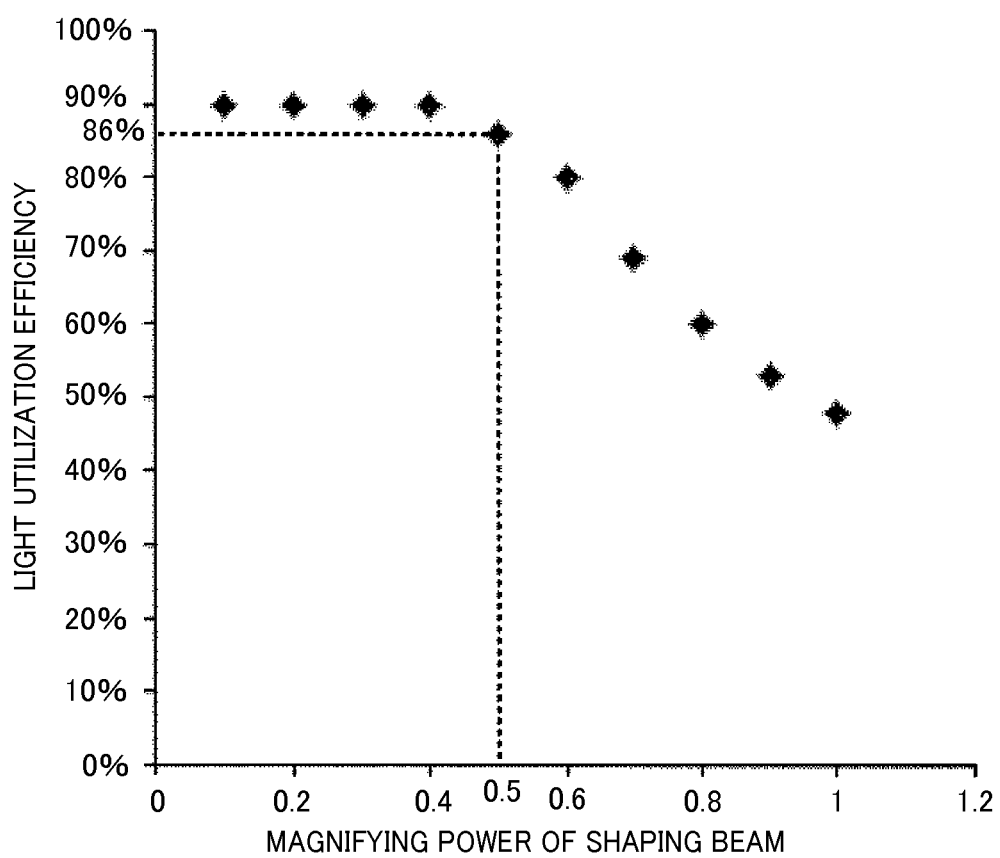
FIG. 4B is a view for showing a relationship between a shaping magnifying power of the reference beam and an efficiency of utilizing light in the embodiment 1 mentioned above.
Figure 4C:
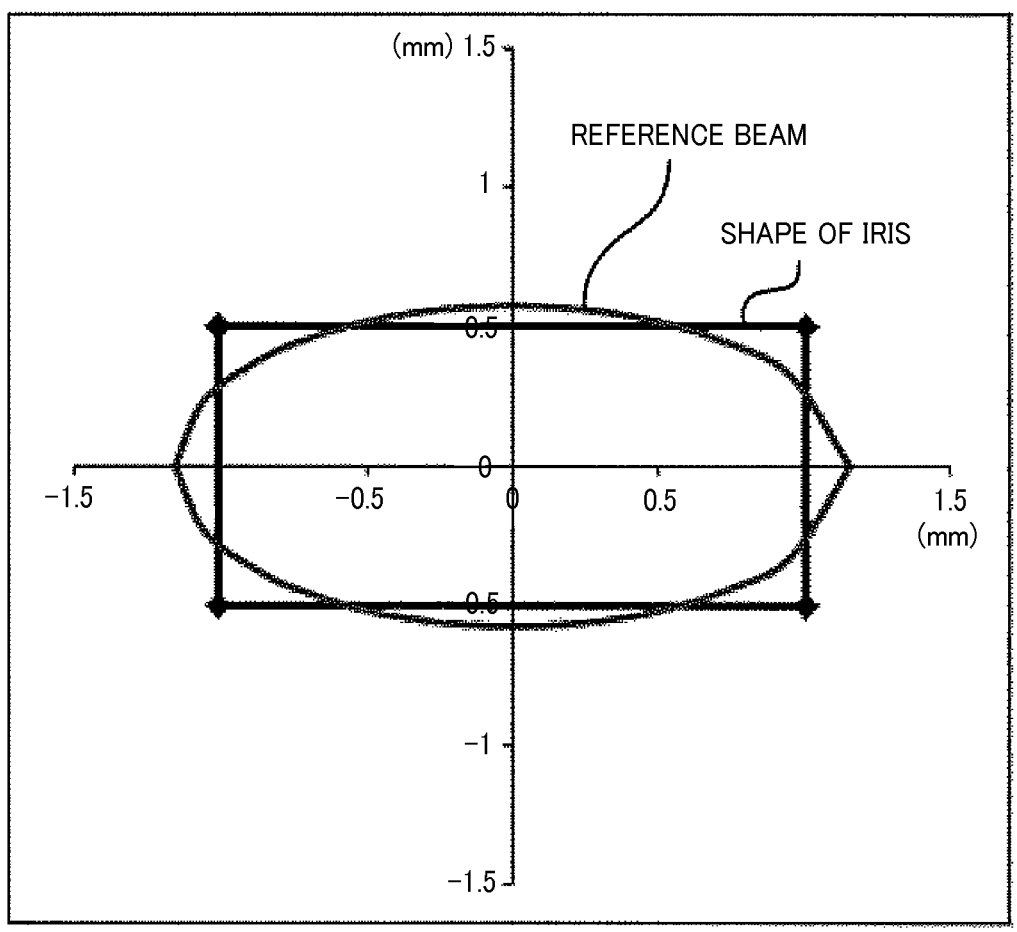
FIG. 4C is a view for showing shapes of the reference beam, being shaped to be 0.5 time (i.e., a half (½)) in a radius thereof in the vertical direction, and the iris, in the embodiment 1 mentioned above.

FIG. 4A shows the shapes of the reference beam and the iris 32. For example, where a light beam of φ 2.3 (mm) is incident upon the rectangular iris of 1 mm (vertical)×2 mm (horizontal), the efficiency of utilizing the light comes to 48%; i.e., losing the light, greatly. Then, according to the present invention, in order to reduce such the loss of the light, the light flux of the reference light is shaped into a desired shape and/or light flux. In more details, for example, with disposing the beam shaper 60 in a front of the iris 32 for the reference light, so as to increase the light flux incident upon the rectangular iris 32 by converting an exact circular beam into an ellipse beam, it is possible to increase the efficiency of utilizing the light. FIG. 4B shows a relationship between a magnifying power of shaping beam and light utilization efficiency. For example, it can be seen that the light utilization efficiency is increased up, by shaping up the beam, in such a manner that the exact circular beam is cut down in the vertical direction (i.e., the pitch direction) thereof, fitting to the shape of the rectangular iris of 1 mm (vertical)×2 mm (horizontal). Further, as is shown in FIG. 4C, if shaping the exact circular beam into an ellipse, being 0.5 time (half (½)) in a radius in the vertical diction thereof, then the light utilization efficiency goes up to 86%; i.e., a great increase of the light utilization efficiency can be expected. However, herein, it is assumed that the direction of controlling the beam is in a direction orthogonal to the multiplex recording direction (i.e., the pitch direction), at least.

Namely, according to the present invention, by means of the optical element, being constructed with the beam shaper 60 and/or the iris 32 mentioned above, and for enabling to shape the light flux of the reference light into a desired shape and/or light flux diameter, i.e., shaping to be irradiated upon only the region contributing to the recording, finally, the reference light is prevented from being irradiated upon an excess region on the optical information recording medium. Also, with this, because of no necessity of making the iris 32 variable; thus, it can be achieved by an iris fixed; it can be achieved with further simple structure thereof. Moreover, those mentioned above are also same to embodiments 2 to 5, which will be mentioned later. And further, the shape of the reference light reaching to the iris 32 should not be limited to the exact circular and/or the ellipse; but it may be a square (i.e., quadrate) or a rectangle or others, for example, polygons, etc.

Embodiment 2

Figure 5:
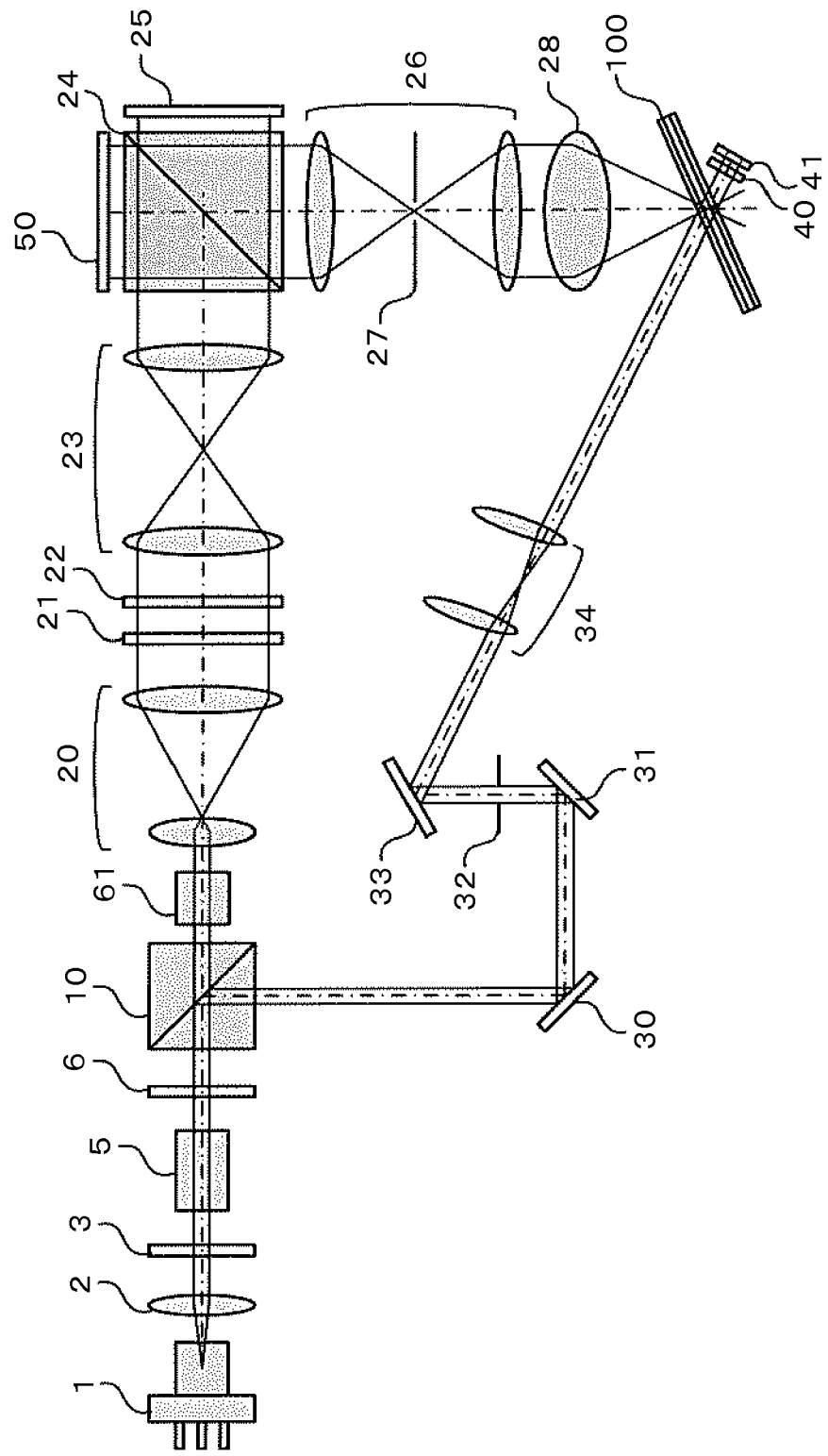
FIG. 5 is a view for showing an optical system in a second embodiment (i.e., an embodiment 2) according to the present invention.

FIG. 5 is a view for showing an optical system of the pickup device for use in hologram of the 2 ray angle multiplexing recording method, according to a second embodiment (i.e., an embodiment 2) of the present invention. In the present embodiment 2, comparing to the embodiment 2, although similar to that in a way of thinking of the recording and/or reproducing method (s) thereof and also the optical element in the angle multiplex method; however, the distinct feature thereof lies in an aspect of having an optical element for shaping the light flux of the signal beam into a desired shape and/or light flux.

In more details thereof, in the present embodiment 2, not disposing such the beam shaper 4 as was mentioned in the embodiment 1, but a beam shaper 61 is disposed within the optical path of the signal beam, for example, between the PBS prism 10 and the beam expander 20; thereby, obtaining an exact circular beam. On the other hand, no shaping is made on the reference light (i.e., no such beam shaper 60 is provided, as in the embodiment 1), and the beam emitting from the light source 1 passes through the iris 32, as an ellipse shaped one, as it is. For example, in case where the light source 1 is a semiconductor laser, the semiconductor laser is disposed in such a manner that a major axis and a minor axis of the ellipse fit to the shape of the rectangular iris 32 of the reference light. With doing this, a further high increase of the light utilization efficiency can be obtained on the iris 32, as well as, in the optical path, not passing through the beam shaper; therefore a further high increase of the light utilization efficiency can be achieved.

Embodiment 3

Figure 6:
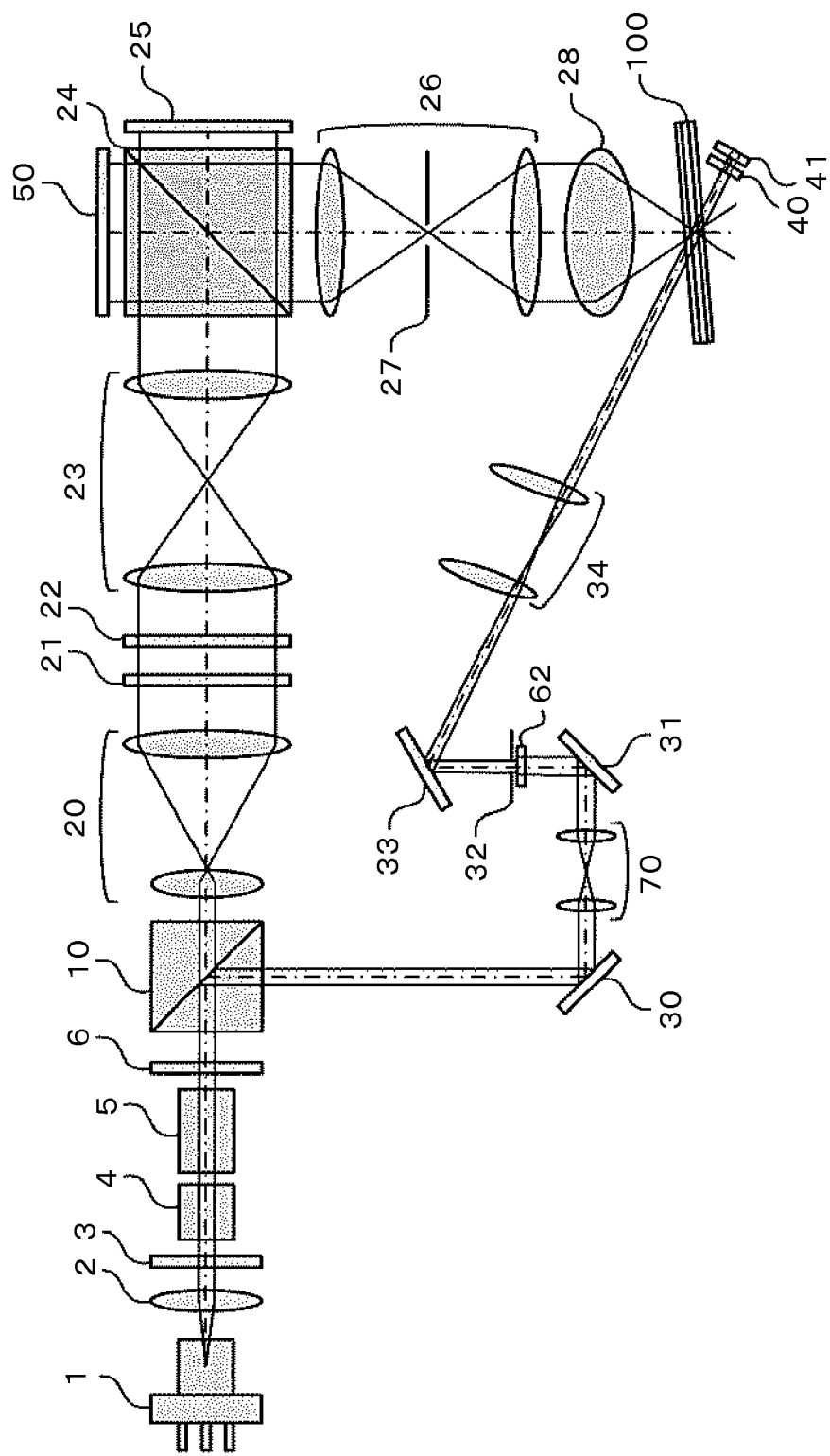
FIG. 6 is a view for showing an optical system in a third embodiment (i.e., an embodiment 3) according to the present invention.

FIG. 6 is a view for showing an optical system of the pickup device for use in hologram of the 2 ray angle multiplexing recording method, according to a third embodiment (i.e., an embodiment 3) of the present invention. Also the present embodiment 3, comparing to the embodiment 1, although similar to that in the way of thinking of the recording and/or reproducing method thereof and also the optical element in the angle multiplex method; however, the distinct feature thereof lies in an aspect of disposing an optical element for transmitting an image produced by the reference light to a point far therefrom.

Figure 7A:
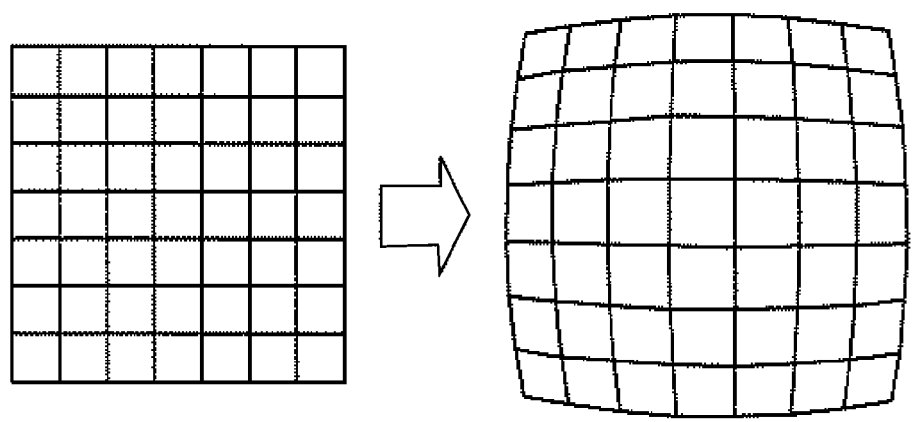
FIG. 7A is a view for showing examples of a barrel-type distortion aberration, which a relay lens has, and also a beam shaping by means of the relay lens having that barrel-type distortion aberration, in the embodiment 3 mentioned above.
Figure 7B:
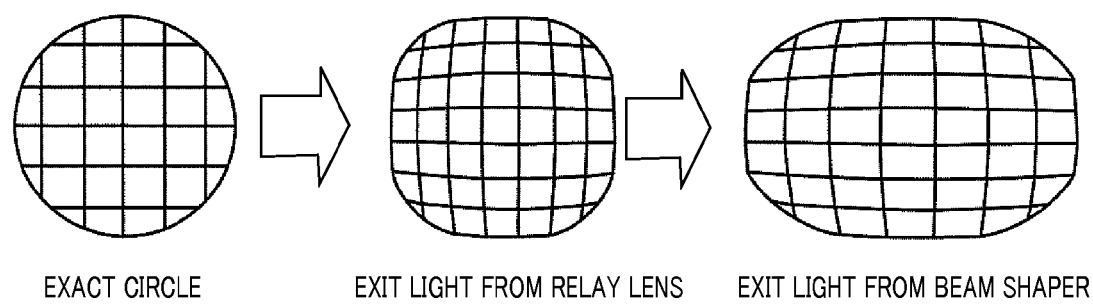
FIG. 7B is a view for showing examples of a barrel-type distortion aberration, which a relay lens has, and also a beam shaping by means of the relay lens having that barrel-type distortion aberration, in the embodiment 3 mentioned above.

In more details thereof, the feature of the present embodiment 3 lies in that, for example, a relay lens 70, which is formed to have a distortion intentionally, is disposed in front of the iris 32 of the reference light. Herein, the distortion means that an image formed is, not similar to, but distorted, with respect to an object, and as is shown in FIG. 7A, when the image is shrunken, as is close to the periphery of a screen, i.e., called a barrel type distortion. When the exact circular beam passes through the relay lens 70 having such barrel type distortion, then as is shown in FIG. 7B, the light exiting from the relay lens 70 comes to be a shape close to the square (i.e., quadrate). In this manner, with disposing the beam shaper 62, further, following to the relay lens 70, it is possible to shape the light beam, which is converted into the square (i.e., quadrate), into a rectangular, and with this, it is possible to obtain a further increase of the light utilization efficiency when the light beam passes through the rectangular iris 32. However, after passing through the iris 32, there may be disposed an optical element for compensating the distortion, which is intentionally owned by the relay lens 70.

Embodiment 4

Figure 8:
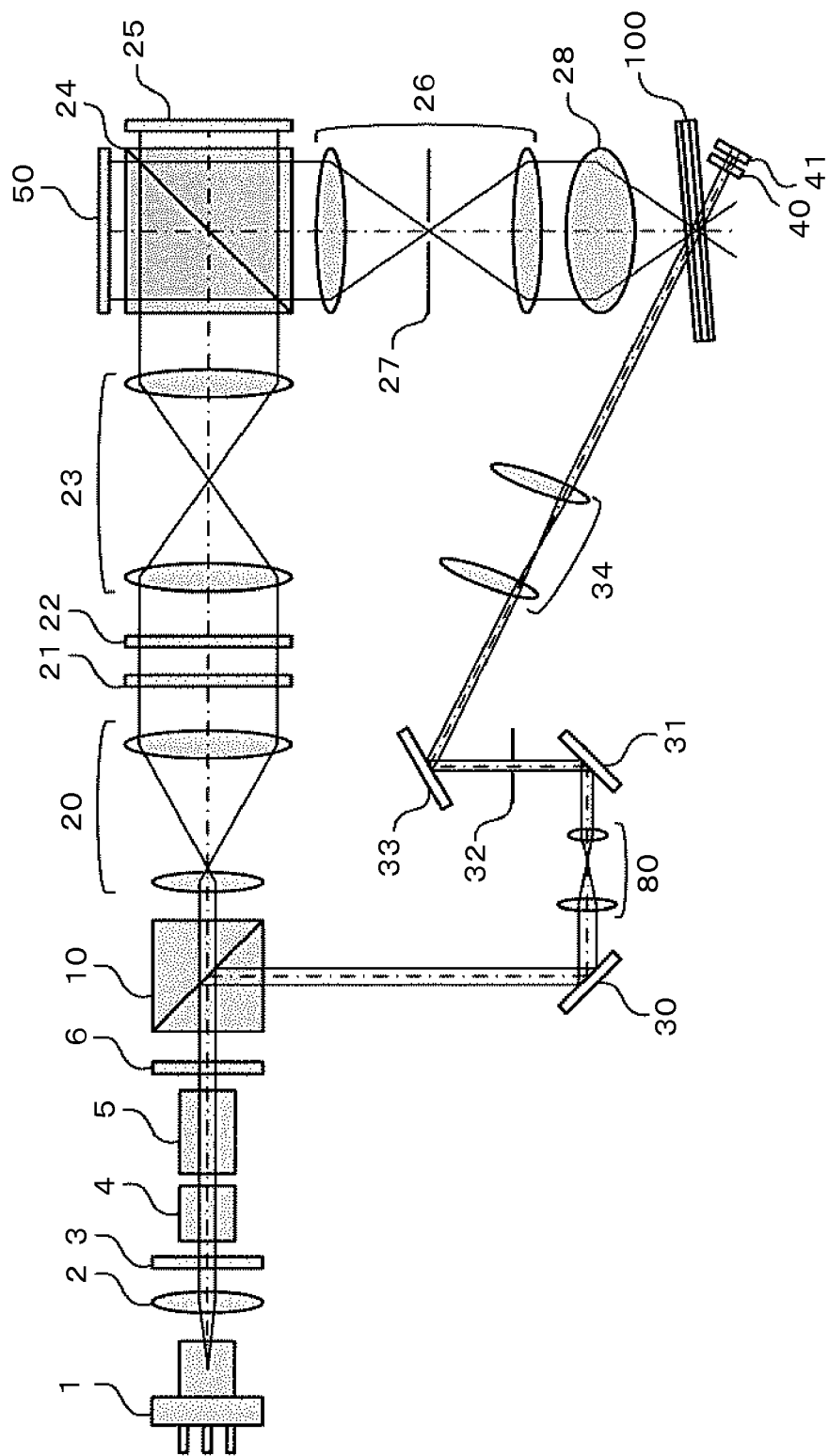
FIG. 8 is a view for showing an optical system in a fourth embodiment (i.e., an embodiment 4) according to the present invention.

FIG. 8 is a view for showing an optical system of the pickup device for use in hologram of the 2 ray angle multiplexing recording method, according to a fourth embodiment (i.e., an embodiment 4) of the present invention. Also the present embodiment 4, comparing to the embodiment 1, though similar to that in the way of thinking of the recording and/or reproducing method (s) and of the rectangular iris with the angle multiplex method; however, the distinct feature thereof lies in an aspect of disposing an optical element, which is able to enlarge or reduce the light flux diameter of the reference light into a desired one.

In more details thereof, in the present embodiment 4, for example, a beam expander 80 for making the light flux diameter variable is disposed in front of the iris 32 in the optical path of the reference light, so as to lessen an amount of light generating the eclipse on the iris 32, by enlarging or reducing the reference light, in such a manner that it can pass through the iris 32. With this, the light utilization efficiency is increased, in the similar manner to that of the embodiments mentioned above.

Embodiment 5

However, when conducting the angle multiplex recording, since the multiplex direction of the reference light changes the effective light flux diameter thereof, contributing to recording, depending on the incident angle thereof also changes, then an area upon the optical information recording medium is irradiated by that reference light. On the other hand, in case where a size of the iris 32 is fixed, as is in the embodiment 1, a total energy irradiated upon the optical information recording medium after passing through that iris 32 comes to be constant. For this reason, energy density contributing to the recording is changed for each angle. On the other hand, the effective light flux diameter and the optical energy of the signal beam can be determined, uniquely.

Accordingly, if assuming that a recording time is always constant, all over the angles, since the information is recorded with a large energy density at a certain angle, and then it is recorded with a small energy density at another certain angle, then the information comes to be recorded, differing from in a SN ratio thereof depending on the angle, and a result thereof, there is generated a problem that reproduction information cannot be obtained, being constant in the quality all over the angels, when reproducing. Also, with the information, which is recorded with the small energy density, it is expected to become large of a noise component of the SN ration, then there is also generated a problem of necessitating a long time for reproducing.

Then, according to a fifth embodiment (i.e., an embodiment 5) of the present invention, for dissolving such the problem as mentioned above, the energy density contributing to the recording is made constant, approximately, within a range of the incident angle of the reference light.

Thus, with changing the effective light flux diameter for each incident angle by the beam expander 20, which is disposed in the embodiment 4 mentioned above, it is possible to obtain high-quality production data, being approximately constant in the SN ratio; however, according to the present embodiment 5, further, as other dissolving means, for brining the energy density within the optical information recording medium to be approximately constant, there is applied a method of changing an energy ratio between the signal beam and the reference light.

In more details thereof, for example, the polarization variable element 6 shown in FIG. 1, which is constructed with the ½ wavelength plate disposed in front of the PBS prism 10, etc., is rotated, i.e., changing an energy ratio between the signal beam and the reference light for each incident angel of the reference light with this, it is possible to adjust the energy so that the energy density is approximately constant, all over the incident angles. If further adjustment is necessary, an iris may be disposed. With this, it is possible to obtain the high-quality reproduction data, as well as, the high-efficiency of the optical system, at the same time.

Figure 9:
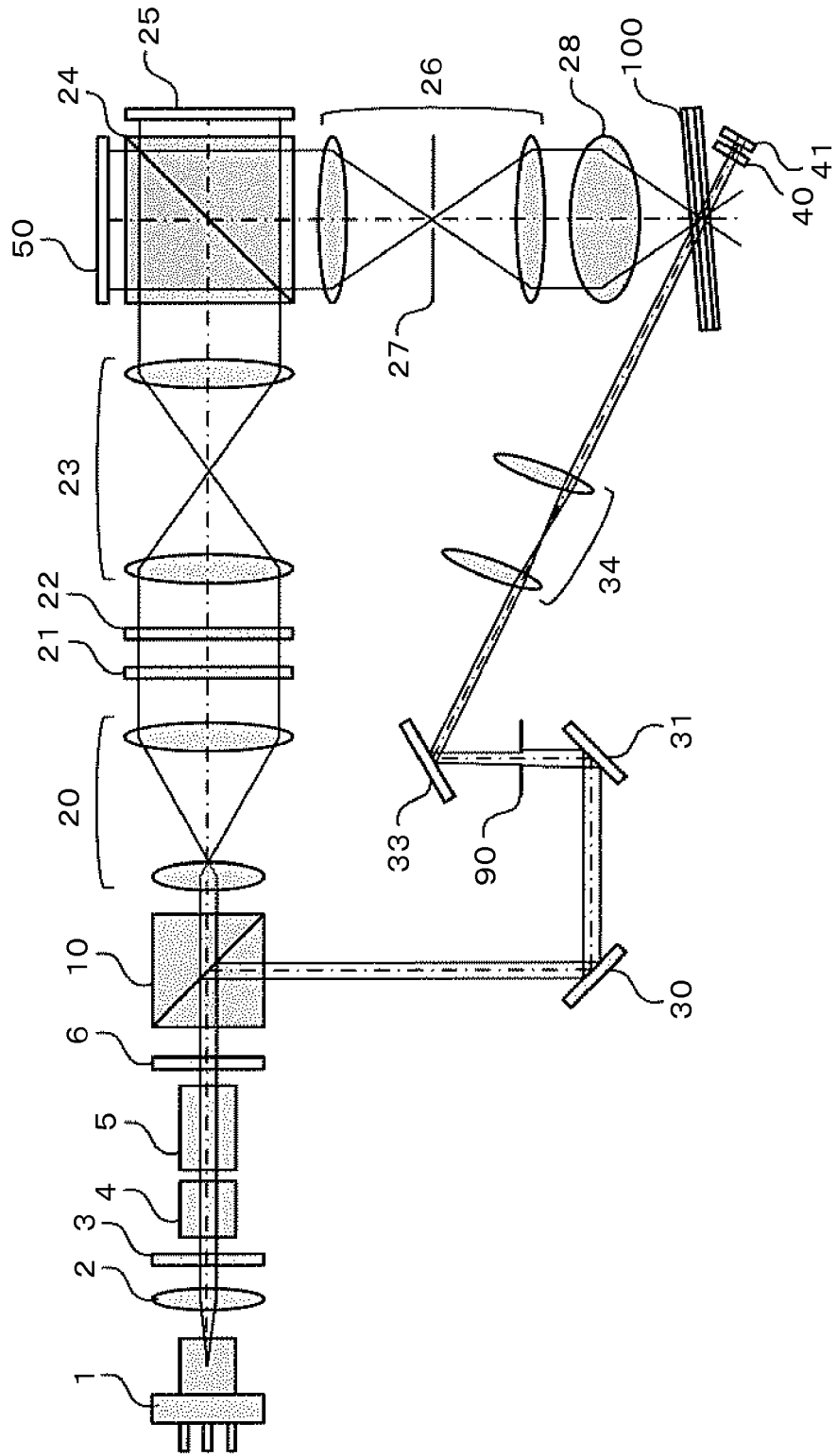
FIG. 9 is a view for showing an optical system in a fifth embodiment (i.e., an embodiment 5) according to the present invention.

FIG. 9 is a view for showing an optical system of a pickup device for use in the hologram of the 2 ray angle multiplexing recording method, according to the fifth embodiment (i.e., the embodiment 5). However, also in this embodiment 5, the recording and/or the reproducing method is/are similar to, comparing to that/those of the embodiment 1 mentioned above.

However, the feature of the present embodiment lies in an aspect of having one (1) or more numbers of iris (s), each of which is able to shape the light flux of the reference light into a desired shape and/or light flux. For example, a variable iris 90 is disposed in the optical path of the reference light. However, the size of the iris 32 mentioned in the embodiment 1 given in the above is fixed at such a size that no eclipse is generated within the light flux contributing to the recording. However, in the present embodiment, because the energy density contributing to the recording changes accompanying with changes of the incident angle of the reference light upon the optical information recording medium, then the SN ratio of the information recorded does not come to be constant, i.e., generating such a problem as mentioned, in the embodiment 4 mentioned above.

For dissolving such problem, the following method can be considered, for example. Thus, upon assumption that scanning angle ranges of the reference light are "$\Theta_O$" to "$\Theta_X$", and that, in the ranges defined by dividing those by "n", averaged values of the light flux diameters are "$\phi_{air-multi}$" and "$\phi_{medium-multi}$", respectively, contributing to the recording within the air and the optical information recording medium, then the size of the iris 90 is determined so that the energy densities come to be nearly equal to within the "n" pieces of angle ranges.

In more details, if assuming that the energy irradiating upon the optical information recording medium is "P", that the energy density within the optical information medium is "E", and that the light flux diameter contributing to the recording in the pitch direction within the optical information recording medium is "$\phi_{media-pitch}$", respectively, then the size of the iris 90 in the multiplex direction can be obtained by applying the following equation (Eq. 3):

$$\text{size in multiplex direction} = P \times \phi_{air-multi} / E \times \phi_{media-multi} \times \phi_{media-pitch} \quad \text{(Eq. 3)}$$

As a result thereof, the iris 90 having a side of the size obtained by the (Eq. 3) is prepared by a number of "n" pieces in total, for each of the scanning angle ranges. And, during the time when scanning is made on the angle ranges mentioned above, the corresponding iris 90 is inserted into the optical path of the reference light, and thereby letting the reference light to pass therethrough. With this, it is possible to achieve the high-quality recording/reproducing of information, as well as, an increase of the utilizing efficiency of the light. However, disposing (i.e., inserting) of the iris 90 within the optical path may be conducted, electrically or mechanically, but the method thereof is out of a question.

And, although the variable iris 90 can also be made into a form, such as, the rectangle or the square (i.e., quadrate), or the exact circular or the ellipse, fitting to the reference beam; however, for example, in case where the iris is constructed to be in a form of two (2) axes perpendicular to a center of the light flux, the sizes of those two (2) axial-shaped irises may be moved or changed, mechanically or electrically. As an example for electrical moving, the following method or the like can be listed up; for example, the variable iris 90 is constructed with plural numbers of pixels of a liquid crystal, while bringing a transmission factor of the pixel(s) to be nearly 100%, corresponding to the range for passing the light therethrough, on the other hand, a reflectivity or an absorption index of the pixel(s) to be nearly 100%, corresponding to the range for shutting off the light thereby, etc. However, the present invention should not be limited to such embodiment as mentioned above, and it is apparent for the person skilled in the art that the variable iris 90 mentioned above can be achieve with various methods other than the above mentioned.

Embodiment 6

Figure 11:
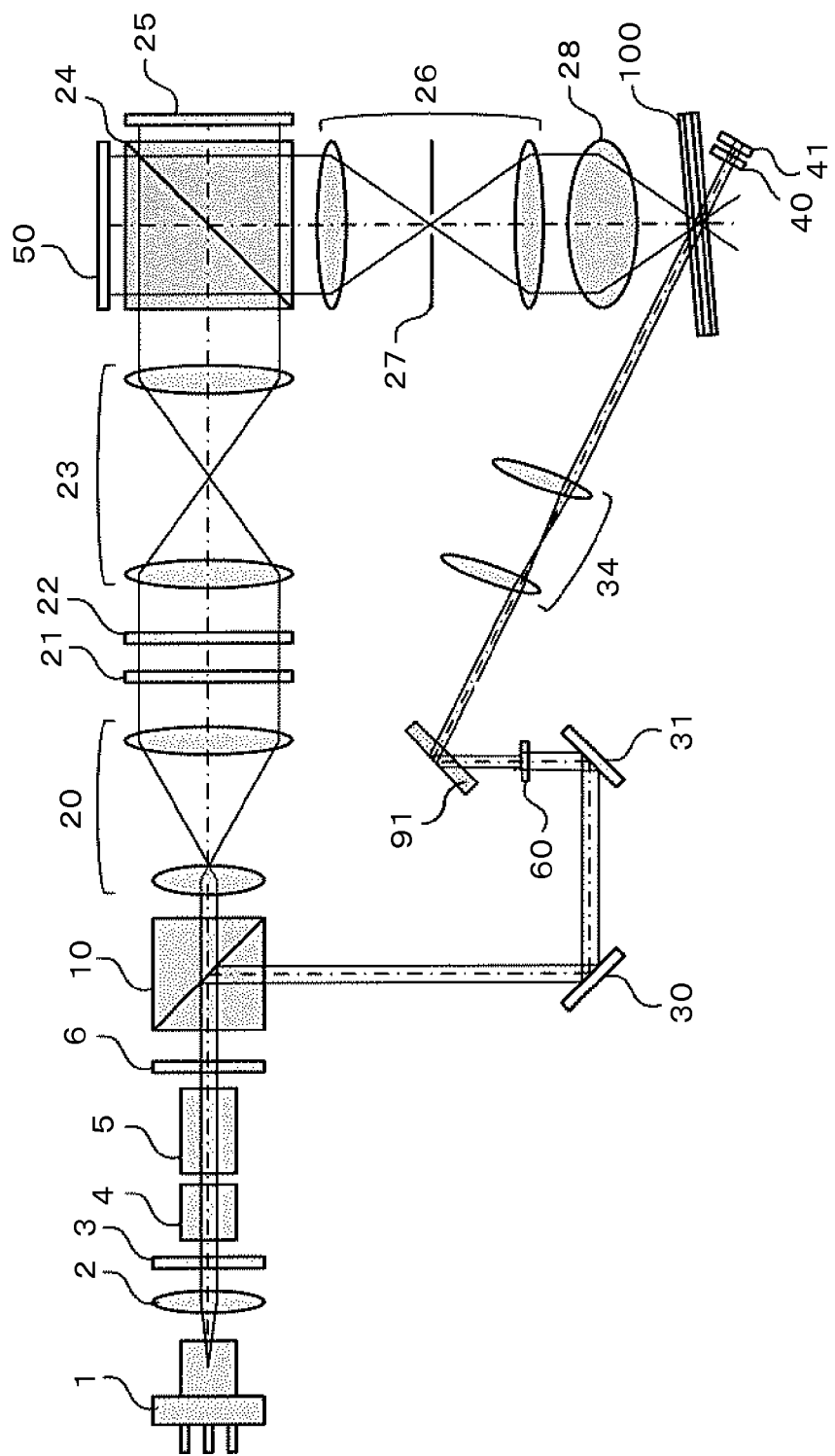
FIG. 11 is a view for showing an optical system in a sixth embodiment (i.e., an embodiment 6) according to the present invention.

FIG. 11 is a view for showing an optical system of the pickup device for use in hologram of the 2 ray angle multiplexing recording method, according to a sixth embodiment (i.e., an embodiment 6) of the present invention. The present embodiment, comparing to the embodiment 1 mentioned above, although similar to that in the way of thinking of the recording and/or reproducing method (s) and also the rectangular iris with the angle multiplex method; however, the distinct feature thereof lies in an aspect of disposing an optical element, which is able to expand or shrink one (1) side of the light flux of the reference light, depending on the incident angel of the reference light upon the recording medium.

In more details, in the present embodiment 6, in the place of the galvano mirror 33 is disposed a wedge prism 91 having a reflection film, rotation of which is controlled by a galvano motor, and an inclined optical surface, within the optical path of the reference light, so that when the rectangular-shaped reference beam is exited from the wedge prism 91, the reference light is enlargedly changed, fitting the length in the direction of incidence of the reference light upon the medium (i.e., the pitch direction) to the incident angle upon the recording medium, while keeping the length constant, in the direction perpendicular to an incident direction of the reference light upon the medium, i.e., fitting to the rotation angle of the wedge prism 91. Also, in principal, because the total energy of the reference light emitting from the wedge prism 91 is constant irrespective of the rotating angle of the wedge prism 91, an amount of light per an area of the reference beam incident upon the recording medium is changed, depending on change of the length of the shaped reference beam in the multiplex direction. Also, a rotation axis or shaft of the wedge prism 91 may be located at such a position that fluctuation of a central position of the reference light exited from comes down to the minimum, almost within the range of scanning by the reference light. With this, similar to the embodiment (s) mentioned above, it is possible increase up the utilizing efficiency of the light. Herein, the reflection film added on the wedge prism 91 may be formed, by applying a reflection coating thereon, which is used in general, or by evaporating a dielectric multi-layer film of, such as, $SiO_2$ or $TiO_2$, etc., on Al or silver.

Figure 12A:
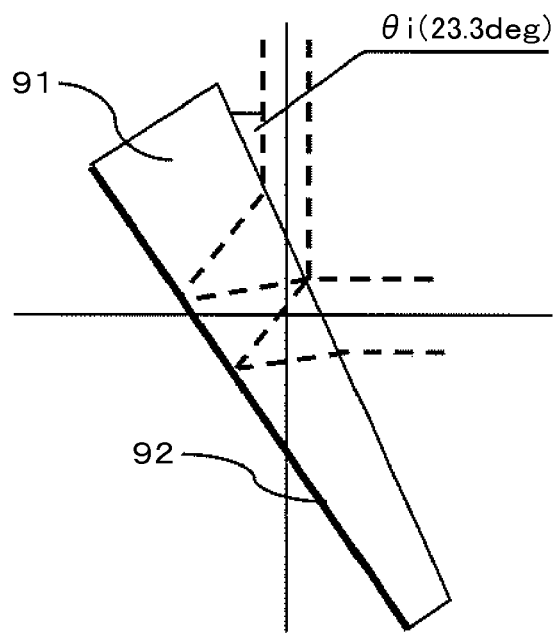
FIG. 12A is a view for showing a wedge prism having a reflection film thereon, in the embodiment 6.
Figure 12B:
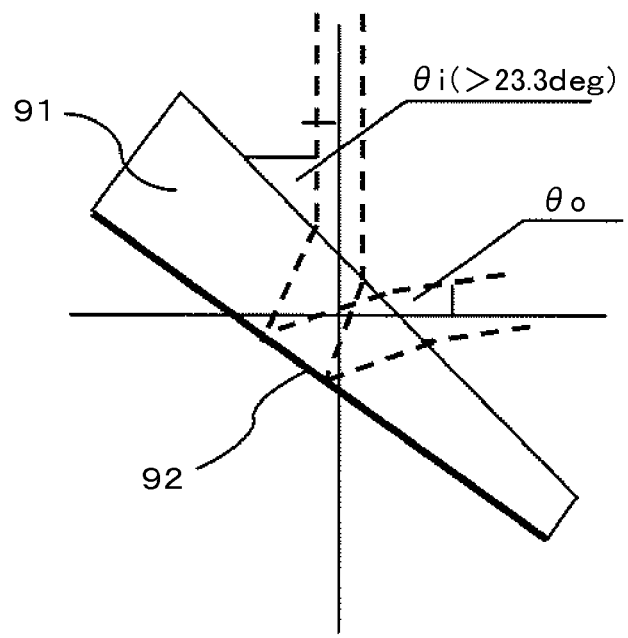
FIG. 12B is a view for showing a wedge prism having a reflection film thereon, in the embodiment 6.

FIGS. 12A and 12B are views for showing the wedge prism 91 having a reflection film 92, according to the embodiment 6. On the wedge prism 91, since thickness of the lens changes depending on the incident angle "θi" and/or the incident position, an exit angle "θo" and the beam diameter of the exiting light are changed, differently, when the incident angle "θi" is small of the reference beam shown by a broken line upon the wedge prism (see FIG. 12A) and when it is large (see FIG. 12B). Also, wave surface of the incident light upon the present wedge prism is uniform, and then if the power density within the light flux is uniform, the wave surface of the exiting light from the present wedge prism is also uniform; i.e., the power density is uniform.

Figure 13:
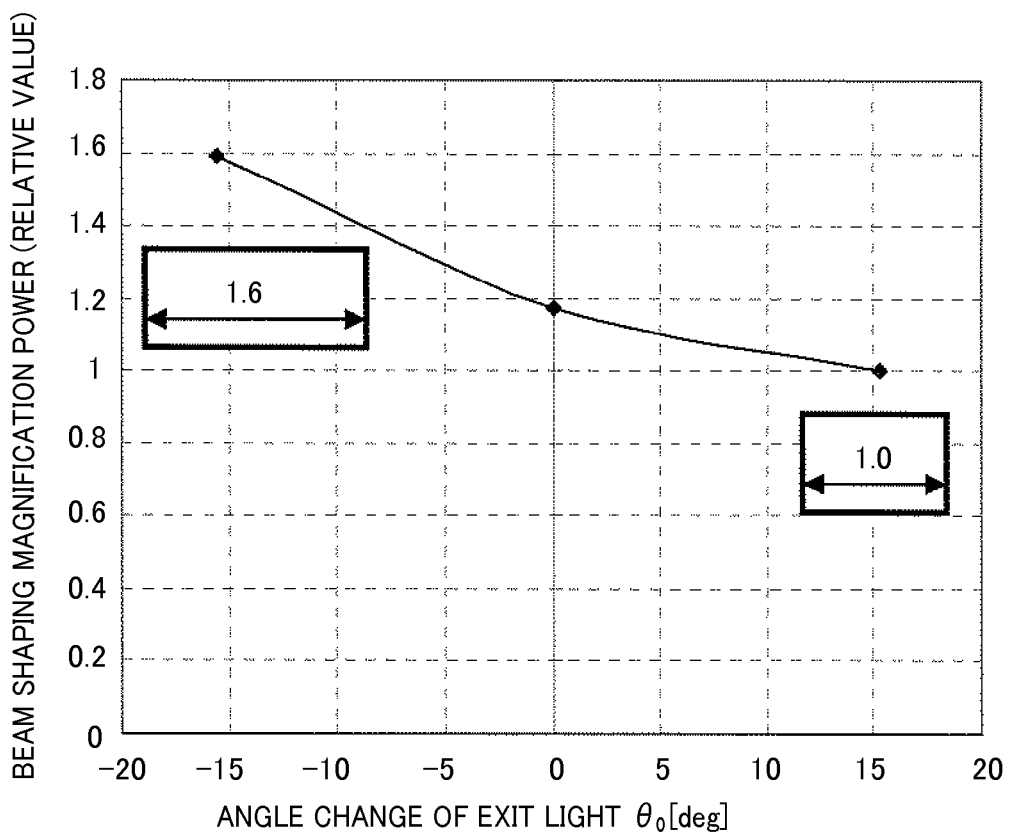
FIG. 13 is a view for showing change of length in a rotating direction of a light flux to be outputted depending on an angle of the light emitting from the wedge prism having the reflection film thereon, in the embodiment 6.

When determining the angle range of the reference light to be 30.0°, the minimum diameter necessary for overlapping with the signal beam inside the optical information recording medium 100 is changed depending on an angle of the reference light. In more details, if assuming that the beam diameter of the reference light (having a central angle is +15.0°) is 1.0, then the beam diameter necessary (at a central angle −15.0°) comes to be around 1.6. FIG. 13 shows the length of the exit light in the multiplex direction, with respect to the exit angle "θo" shown in FIGS. 12A and 12B. In present calculation, it is assumed that thickness of the wedge prism 91 at the center thereof is 1 mm, the refractive index thereof is 1.5, and a center of the incident angle "θi" is 23.3°, respectively. From the present result, it can be seen that the length of the reference beam is changed by 1.6 times in the multiplex direction thereof, within the scanning range of ±15°.

Figure 14:
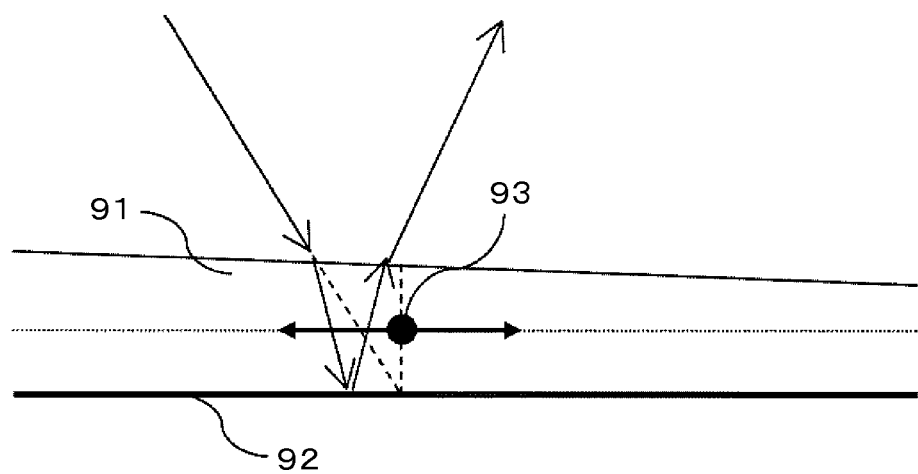
FIG. 14 is a view for showing a rotation axis of the wedge prism having the reflection film thereon, in the embodiment 6.
Figure 15:
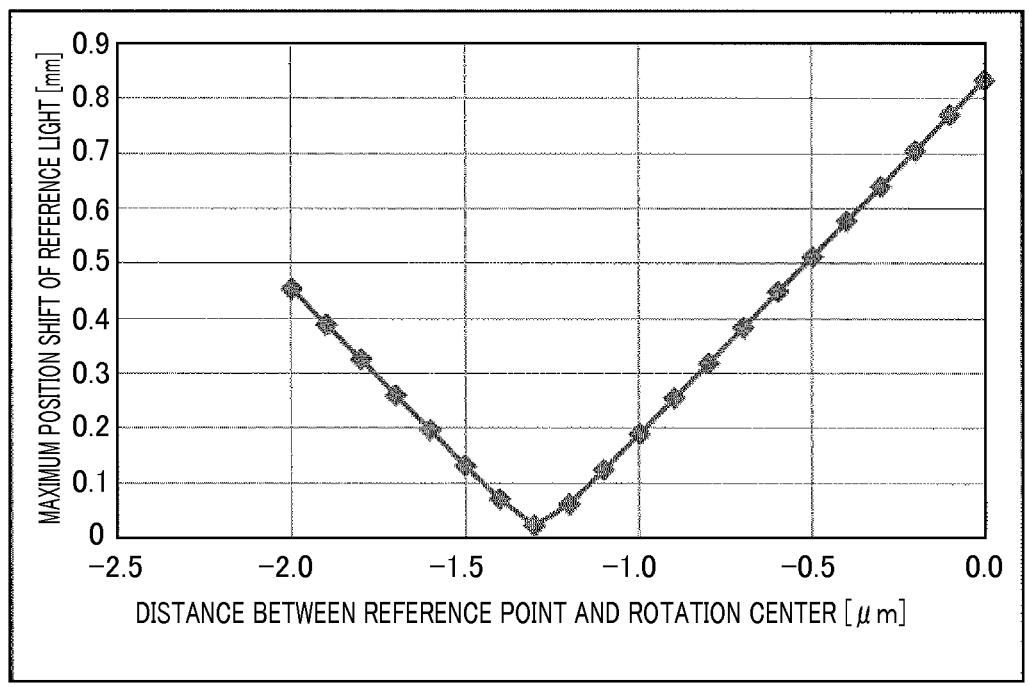
FIG. 15 is a view for showing change of a fluctuation range of the central position of the light flux to be outputted, depending on a position of the rotation angle of the wedge prism having the reflection film thereon, in the embodiment 6.

Also, FIG. 15 shows a result of calculation of, in which range (s) fluctuate (s) the center of the light flux of the reference light to be exited, within the scanning range of ±15°, depending on the position of the rotation axis of the wedge prism 91 having the reflection film 92 thereon. A reference point in the present figure is also determined, similar to a reference point 93 in FIG. 14, at the position separating by 0.5 mm from the refection surface of the wedge prism, where an incident light extending into the medium comes across the reflection surface. Upon examining the fluctuation of the center of the reference beam within the scanning range of ±15° while moving the rotation center horizontally, from the present reference point 93, it can be seen that the central fluctuation of the reference beam at the position of about −1.3 mm can be suppressed down to about 22 μm, with which no problem is generated in the performance thereof. With the mirror having the thickness of 1.0 mm, which is commonly used in the galvano mirror, the position for minimizing the central fluctuation of the reference beam is 0.012 mm, and from this fact, in the present embodiment, it can be seen that it is important to rotate the wedge prism at the position for minimizing the central fluctuation of the reference beam.

<Optical Information Recording/Reproducing Apparatus>

Figure 10:
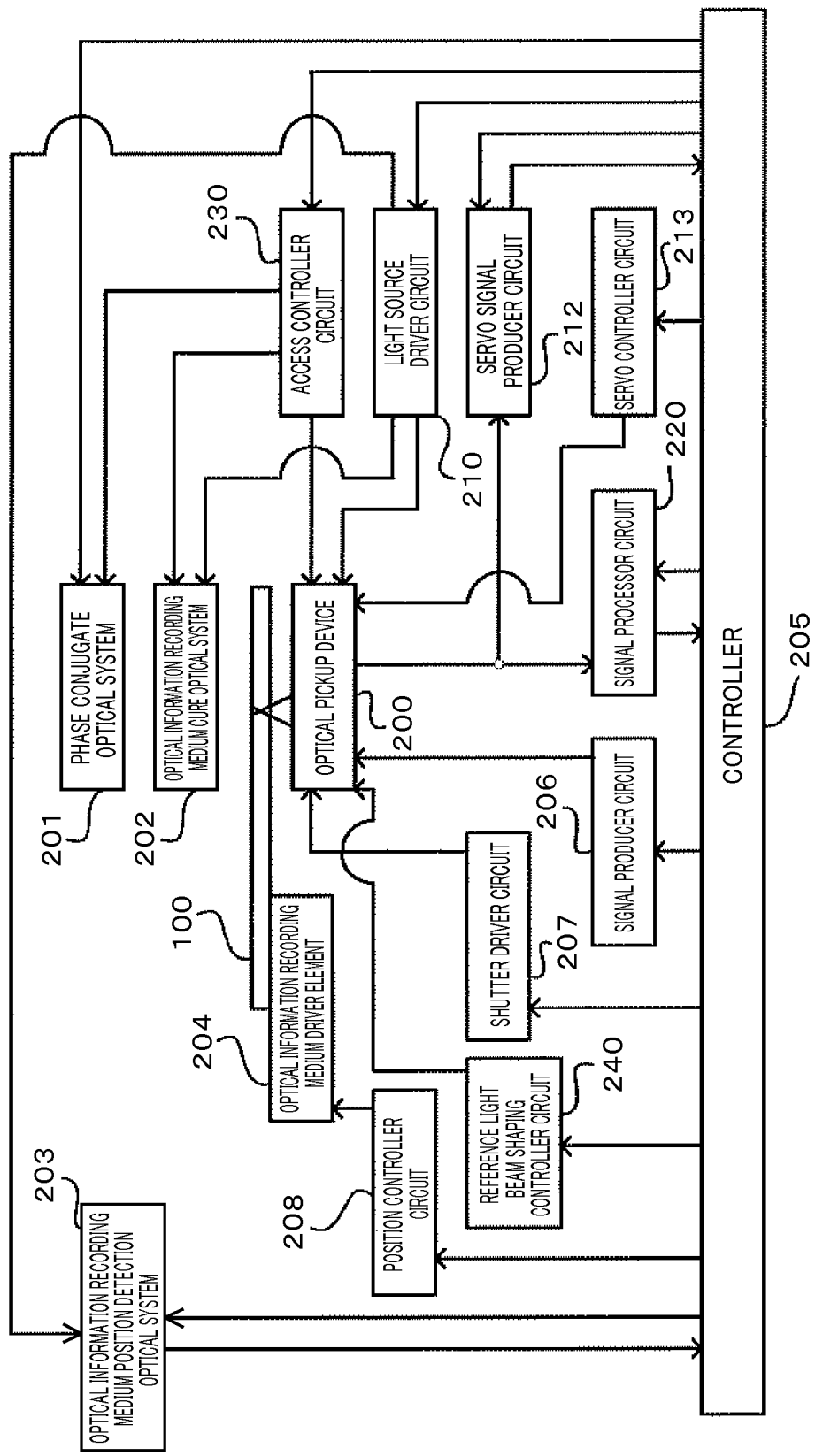
FIG. 10 is a block diagram for showing an entire structure of an optical information recording/reproducing apparatus, having the pickup device for use of hologram mentioned above, in a part thereof.

Further, FIG. 10 is a block diagram for showing the entire structure of an optical information recording/reproducing apparatus for reproducing or recoding/reproducing digital information, with using the hologram therein, while adopting the pickup device for use of hologram mentioned above.

The optical information recording/reproducing apparatus comprises, for example, the optical pickup device 200 having such construction as shown in FIG. 1, a phase conjugation optical system 201, an optical information recording medium Cure optical system 202, an optical information recording medium position detection optical system 203, and an optical information recording medium driving element 204, and within such the structure, the optical information recording medium 100 is able to change the recording position in relative to the optical pickup device.

Thus, the optical pickup device 200 has roles of emitting the reference light and the signal beam upon the optical information recording medium 100, and recording the digital information with applying the hologram therein. In that instance, an information signal to be recorded is sent to the spatial light light modulator within the optical pickup device 200, by a controller 205, via a signal producer circuit 206, and the signal beam is modulated by the spatial light modulator.

On the other hand, when reproducing the information recorded on the optical information recording medium 100, a phase conjugated light of the reference light emitting from the optical pickup device 200 is produced by the phase conjugation optical system 201. Herein, the phase conjugation optical system 201 designates, for example, the ¼ wavelength plate 40 and the galvano mirror 41, in the case shown in FIG. 1. Also, the phase conjugated light means a light wave propagating in a direction opposite to an input light, while keeping the same wave surface thereof. The reproduction light, which is reproduced by the phase conjugated light, is detected by an image pickup element within the optical pickup device, and a signal is produced within signal processor circuit 220.

When recording the information thereon, an irradiation time of the signal beam and the reference light upon the optical information recording medium is controlled (or adjusted) through a shutter controller circuit 207, through controlling ON/OFF time of a shutter, which will be mentioned later, by the controller 205, within the optical pickup device 200.

The optical information recording medium Cure optical system 202 has a role of producing a light beam to be used in pre-cure and post-cure of the optical information recording medium 100. Herein, the pre-cure means a pre-process of irradiating a predetermined light beam, in advance, before irradiating the signal beam and the reference light at a desired position, when recording the information at the desired position within the optical information recording medium 100. Also, the post-cure means a post-process of irradiating a predetermined light beam, after recording the information at the desired position within the optical information recording medium 100, for making overwriting unable, at the desired position.

The optical information recording medium position detection optical system 203 is used for detecting a position on the optical information recording medium 100. When adjusting the optical information recording medium 100 at the predetermined position, detection is made on a signal depending on the position on the optical information recording medium 100, which is produced within the optical pickup device 200, by means of optical information recording medium position detection optical system 203, and the position of the optical information recording medium 100 is controlled through a position controller circuit 208, by means of the controller 205, with applying that signal detected.

From a light source driver circuit 210, predetermined light source driving current is supplied to light sources within the optical pickup device 200, the optical information recording medium Cure optical system 202 and the optical information recording medium position detection optical system 203, respectively, and wherein each light source emits the light beat, by a predetermined amount thereof.

By the way, since the recording technology applying the holography therein is a technology for enabling ultra-high density recording of information, it shows a tendency of, for example, regulating a permissible error to be extremely small, with respect to an inclination and/or a position shift of the optical information recording medium 100. Accordingly, in the optical pickup device 200, with provision of a mechanism for detecting the inclination and/or the position shift of the optical information recording medium 100, i.e., for detection of a shift amount of a factor, being small (or strict) in the permissible error thereof, a servo mechanism may be provided within the optical information recording/reproducing apparatus; i.e. a mechanism for producing a signal for use of servo control within a servo signal producer circuit 212 and adjusting the shift amount through a servo controller circuit 213.

Also, with the optical pickup device 200, the phase conjugation optical system 201, the optical information recording medium Cure optical system 202 and the optical information recording medium position detection optical system 203, they may be constructed in the form of plural numbers of optical systems, or all structures of those may be assembled into one optical system; i.e., for simplification thereof.

Also, as the feature of this optical information recording/reproducing apparatus, there are provided a controller circuit 240 for shaping the beam of the reference light within that apparatus, then control can be made upon shape and/or light flux diameter of the reference light, enlarging or shrinking of the beam, and/or the shape and/or size of the variable iris 90, which is disposed within the optical pickup device 200, depending on the necessity thereof.

However, the embodiments mentioned above are explained in the details thereof, for easy understanding of the present invention, and therefore, the present invention should not be restricted to those embodiments mentioned above; but may includes various variations thereof, and for example, it should not be limited, necessarily, only to that having all of the constituent elements explained in the above. Also, it is possible to add the constituent element (s) of other embodiment (s) to the constituent elements of a certain embodiment. Further, to/from/for a part of the constituent elements of each embodiment can be added/deleted/substituted other constituent element(s).

What is claimed is:

1. An optical information recording/reproducing apparatus, applying hologram of a angle multiplex recording method therein, comprising:
    a light source, which is configured to emit a light beam thereform;
    a divider unit, which is configured to divide the light beam emitting from the light source into a signal beam and a reference light;
    an angle variable unit, which is configured to change an angle of the reference light incident upon an optical information recording medium;
    a spatial light modulator unit, which is configured to add information to the signal beam;
    an objective lens, which is configured to irradiate the signal beam upon the optical information recording medium;
    an image pickup unit, which is configured to detect a diffracted light generating from a recording region within the optical information recording medium, when the reference light is irradiated upon the optical information recording medium; and
    an optical element, which is configured to shape a form of light flux of the reference light, wherein
    said optical element shapes up the form of light flux of the reference light, so that a light flux diameter of the reference light in a multiplex direction comes to be larger than the light flux diameter of the reference light in a pitch direction.

2. The optical information recording/reproducing apparatus, as described in the claim 1, wherein
    said optical element changes the form of light flux of the reference light, depending on an incident angle of the reference light.

3. The optical information recording/reproducing apparatus, as described in the claim 2, wherein
    said optical element shapes up the form of light flux of the reference light, so that an energy density contributing to recording on the optical information recording medium comes to be nearly constant, within a range, where the reference light is incident upon.

4. The optical information recording/reproducing apparatus, as described in the claim 2, wherein
said optical element changes the form of light flux of the reference light in a first order.

5. The optical information recording/reproducing apparatus, as described in the claim 4, wherein
a direction of shaping made by said optical element is a multiplex direction.

6. The optical information recording/reproducing apparatus, as described in the claim 2, wherein
said optical element changes the form of light flux of the reference light into the multiplex direction depending on the incident angle of the reference light, and also fixes the form of light flux of the reference light in the pitch direction.

7. The optical information recording/reproducing apparatus, as described in the claim 1, wherein
said optical element changes the form of light flux of the reference light, so that a total light amount of the reference light incident upon the optical information recording medium and a total light amount of the reference light emitting from the light source come to be equal to, approximately.

8. The optical information recording/reproducing apparatus, as described in the claim 1, wherein
said optical element has at least either one of a beam shaper and a rectangular iris.

9. The optical information recording/reproducing apparatus, as described in the claim 8, wherein
said iris constructing said optical element is a fixed iris.

10. The optical information recording/reproducing apparatus, as described in the claim 9, wherein
said optical element has a relay lens having a barrel type distortion, or a beam expander, in addition to, or in the place thereof.

11. The optical information recording/reproducing apparatus, as described in the claim 10, wherein
said iris building up said optical element is a variable iris.

12. The optical information recording/reproducing apparatus, as described in the claim 1, wherein
said optical element is a wedge prism.

13. The optical information recording/reproducing apparatus, as described in the claim 12, wherein
a rotation shaft is provided at such a position that fluctuation of a center of light flux of the reference light exiting from said wedge prism come to nearly minimum, in said angle variable unit.

14. The optical information recording/reproducing apparatus, as described in the claim 1, wherein
said optical element shapes up the form of light flux of an irradiation light into the following:

size in multiplex direction=$P \times \phi_{air\text{-}multi}/E \times \phi_{media\text{-}multi} \times \phi_{media\text{-}pitch}$ where averaged values of light flux diameters contributing to recording within an air and the optical information recording medium are "$\phi_{air\text{-}multi}$" and "$\phi_{air\text{-}multi}$", energy irradiating on the optical information recording medium is "P", an energy density within the optical information medium is "E", and a light flux diameter contributing to recording in the pitch direction within the optical information recording medium is "$\phi_{media\text{-}pitch}$", respectively.

* * * * *